US011972759B2

(12) United States Patent
Kwatra et al.

(10) Patent No.: US 11,972,759 B2
(45) Date of Patent: Apr. 30, 2024

(54) AUDIO MISTRANSCRIPTION MITIGATION

(71) Applicant: INTERNATIONAL BUSINESS MACHINES CORPORATION, Armonk, NY (US)

(72) Inventors: Shikhar Kwatra, San Jose, CA (US); Vijay Ekambaram, Chennai (IN); Hemant Kumar Sivaswamy, Pune (IN); Rodrigo Goulart Silva, Raleigh, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 212 days.

(21) Appl. No.: 17/109,994

(22) Filed: Dec. 2, 2020

(65) Prior Publication Data

US 2022/0172713 A1     Jun. 2, 2022

(51) Int. Cl.
*G10L 15/19* (2013.01)
*G06V 10/40* (2022.01)
(Continued)

(52) U.S. Cl.
CPC .............. *G10L 15/19* (2013.01); *G06V 10/40* (2022.01); *G06V 20/41* (2022.01); *G06V 30/10* (2022.01);
(Continued)

(58) Field of Classification Search
CPC ......... G10L 15/08; G10L 15/10; G10L 15/20; G10L 15/22; G10L 15/24; G10L 15/26;
(Continued)

(56) References Cited

U.S. PATENT DOCUMENTS 9,916,538 B2  3/2018  Zadeh et al.
10,388,272 B1 8/2019 Thomson et al.
(Continued)

OTHER PUBLICATIONS

Daga, P. et al., "Domain-Specific Language Model Using Domain Literature and Experts' Spoken Language," IP.Com Prior Art Database, Technical Disclosure IPCOM000251170D, Oct. 20, 2017, Cisco Systems, Inc. © 2017, 11 pg.
(Continued)

*Primary Examiner* — Michelle M Koeth
*Assistant Examiner* — Paul J. Mueller
(74) *Attorney, Agent, or Firm* — CUENOT, FORSYTHE & KIM, LLC (57) ABSTRACT

Mitigating mistranscriptions resolves errors in a transcription of the audio portion of a video based on a semantic matching with contextualized data electronically garnered from one or more sources other than the audio portion of the video. A mistranscription is identified using a pretrained word embedding model that maps words to an embedding space derived from the contextualizing data. A similarity value for each vocabulary word of a multi-word vocabulary of the pretrained word embedding model is determined in relation to the mistranscription. Candidate words are selected based on the similarity values, each indicating a closeness of a corresponding vocabulary word to the mistranscription. The textual rendering is modified by replacing the mistranscription with a candidate word that, based on average semantic similarity values, is more similar to the mistranscription than is each other candidate word.

20 Claims, 5 Drawing Sheets

(51) Int. Cl.
| | |
|---|---|
| *G06V 20/40* | (2022.01) |
| *G06V 30/10* | (2022.01) |
| *G10L 15/10* | (2006.01) |
| *G10L 15/18* | (2013.01) |
| *G10L 15/22* | (2006.01) |
| *H04N 21/439* | (2011.01) |
| *H04N 21/44* | (2011.01) |

(52) U.S. Cl.
CPC .......... *G10L 15/10* (2013.01); *G10L 15/1815* (2013.01); *G10L 15/22* (2013.01); *H04N 21/4394* (2013.01); *H04N 21/44008* (2013.01)

(58) Field of Classification Search
CPC ... G10L 15/183; G10L 15/1815; G06V 10/40; G06V 10/82; G06V 15/19; G06V 20/41; G06V 20/46; G06V 30/10
See application file for complete search history.

(56) References Cited

U.S. PATENT DOCUMENTS

| | | | | |
|---|---|---|---|---|
| 10,580,435 | B2 | 3/2020 | Ashouri et al. | |
| 2011/0112832 | A1* | 5/2011 | Prorock | G11B 27/36 704/E15.044 |
| 2015/0019206 | A1* | 1/2015 | Wilder | G06V 40/174 704/235 |
| 2017/0345324 | A1* | 11/2017 | Fanty | G09B 19/00 |
| 2017/0358297 | A1* | 12/2017 | Scheiner | G10L 15/22 |
| 2018/0270446 | A1* | 9/2018 | Weil | H04N 5/9202 |
| 2018/0373952 | A1* | 12/2018 | Bui | G06V 30/153 |
| 2019/0362834 | A1* | 11/2019 | Venkataraman | G06N 20/00 |
| 2020/0242563 | A1* | 7/2020 | Jain | G06Q 10/06 |
| 2020/0364463 | A1* | 11/2020 | Pooja | G06V 20/47 |
| 2021/0004437 | A1* | 1/2021 | Zhang | G06N 20/20 |
| 2021/0142789 | A1* | 5/2021 | Gurbani | G10L 15/16 |
| 2021/0192147 | A1* | 6/2021 | Zhang | G06F 40/51 |
| 2021/0383798 | A1* | 12/2021 | Zhang | G06F 16/3329 |

OTHER PUBLICATIONS

"Generating Punctuation for Spoken Text," IP.Com Prior Art Database, Technical Disclosure IPCOM000252105D, Dec. 15, 2017, 36 pg.

"Hyper Suggestion Spans for Improved Text Correction," IP.Com Prior Art Database, Technical Disclosure IPCOM000252338D, Jan. 5, 2018, 11 pg.

Grönroos, S.A. et al., "MeMAD Deliverable 4.1, Report On Multi-Modal Machine Translation, Methods for Managing Audiovisual Data: Combining Automatic Efficiency with Human Accuracy" University of Helsinki, MeMad Project, Methods for Managing Audiovisual Data, Oct. 3, 2017, 55 pg.

Sulubacak, U. et al., "Multi-Modal Machine Translation Through Visuals and Speech," Machine Translation, Sep. 2020, vol. 34, No. 2, pp. 97-147.

Van Der Werff, L., "Evaluation of Noisy Transcripts for Spoken Document Retrieval," Dissertation Submission, University of Twente, Jul. 5, 2012, 136 pg.

Ghosh, S. et al., "Neural Networks for Text Correction and Completion in Keyboard Decoding," Journal of Latex Class Files, vol. 14, No. 8, Aug. 2015, arXiv preprint arXiv: 1709.06429. Sep. 19, 2017, 136 pg.

"Free grammar checker online—Ginger Software," [online] Ginger Software © 2020, retrieved Dec. 1, 2020, retrieved from the Internet: <https://www.gingersoftware.com/grammarcheck>, 3 pg.

Paino, A., "Deep Text Corrector," [online] GitHub, Inc. © 2020, retrieved Dec. 1, 2020, retrieved from the Internet: <https://github.com/atpaino/deep-text-corrector>, 7 pg.

Wormer, T., "nspell," [online] GitHub, Inc. © 2020, retrieved Dec. 1, 2020, retrieved from the Internet: <https://github.com/wooorm/nspell>, 12 pg.

Mbugua, D., "How to Automatically Transcribe Video Files into Text Using YouTube," [online] YouTube, Inc., retrieved Sep. 14, 2020, retrieved from the Internet: <https://www.youtube.com/watch?v-mluVURa4ivl>, 7 pg.

Lin, H., "Levenshtein Distance Spelling Correction," [online] Programming Journey, Jan. 18, 2014, retrieved from the Internet: <http://hsiangholin.github.io/blog/posts/2014/01/levenshtein-distance-spelling-correction.html>, 3 pg.

Manning, C.D. et al., "Spelling Correction," [online] In Introduction to Information Retrieval, Cambridge University Press © 2008, retrieved Sep. 14, 2020, retrieved from the Internet: <https://nlp.stanford.edu/IR-book/html/htmledition/spelling-correction-1.html>, 1 pg.

Cucerzan, S. et al. "Spelling correction as an iterative process that exploits the collective knowledge of web users," In Proc. of the 2004 Conf. on Empirical Methods in Natural Language Processing, Jul. 2004, pp. 293-300.

Currie, D., "Creating a Spell Checker with TensorFlow," [online] Towards Data Science, May 18, 2017, retrieved from the Internet: <https://towardsdatascience.com/creating-a-spell-checker-with-tensorflow-d35b23939f60>, 5 pg.

* cited by examiner

Obtain a textual rendering of the audio portion of a video, the textual rendering generated by a natural language speech-to-text processor

202

---

Generate an augmented rendering by combining the textual rendering with contextualizing data electronically garnered from one or more sources other than the audio portion of the video

204

---

Identify a mistranscription within the textual rendering using a pretrained word embedding model that creates machine-encoded data structures based on mapping words to an embedding space derived from the contextualizing data

206

---

Select from among a multi-word vocabulary of the pretrained word embedding model a plurality of candidate words for replacing the mistranscription, the selecting based on similarity values determined for each vocabulary word, each similarity value indicating a closeness of a corresponding vocabulary word to the mistranscription

208

---

Modify the textual rendering by replacing the mistranscription with a candidate word that, based on a comparison of average semantic similarity values of each candidate word in relation to each word contained in the augmented rendering, is more similar to the mistranscription than is each of the other candidate words

AUDIO MISTRANSCRIPTION MITIGATION

BACKGROUND

This disclosure relates to natural language processing, and more particularly, to automated transcribing of the audio portions of video content.

Video content is available over a wide variety of channels. In addition to more conventional commercial broadcast channels that have long provided content over television (TV) channels, an increasing amount of video content is available through online video platforms. Online video platforms enable the uploading, viewing, and sharing of video content, such as video clips, TV shows, music videos, movie trailers, documentaries, live streams, and educational programs. While much of the video content available from online video platforms is uploaded by individuals, various media corporations also offer video content through online video platforms. A growing number of online video channels allow a user to receive content by selecting a channel's subscribe button to receive a subscription feed that typically comprises video content recently published by the channel.

SUMMARY

In one or more embodiments, a method includes obtaining a textual rendering of an audio portion of a video, wherein the textual rendering is generated by a natural language speech-to-text processor. The method includes obtaining a textual rendering of an audio portion of a video, the textual rendering generated by a natural language speech-to-text processor. The method includes generating an augmented rendering by combining the textual rendering with contextualizing data that is electronically garnered from one or more sources other than the audio portion of the video. The method includes identifying a mistranscription within the textual rendering using a pretrained word embedding model that creates machine-encoded data structures based on mapping words to an embedding space derived from the contextualizing data. The method includes selecting from among a multi-word vocabulary of the pretrained word embedding model a plurality of candidate words for replacing the mistranscription. The selecting is based on similarity values determined for each vocabulary word, each similarity value indicating a closeness of a corresponding vocabulary word to the mistranscription. The method includes modifying the textual rendering by replacing the mistranscription with a candidate word that, based on a comparison of average semantic similarity values of each candidate word in relation to each word contained in the augmented rendering, is more similar to the mistranscription than is each of the other candidate words.

In one or more embodiments, a system includes a processor configured to initiate operations. The operations include obtaining a textual rendering of an audio portion of a video, the textual rendering generated by a natural language speech-to-text processor. The operations include generating an augmented rendering by combining the textual rendering with contextualizing data that is electronically garnered from one or more sources other than the audio portion of the video. The operations include identifying a mistranscription within the textual rendering using a pretrained word embedding model that creates machine-encoded data structures based on mapping words to an embedding space derived from the contextualizing data. The operations include selecting from among a multi-word vocabulary of the pretrained word embedding model a plurality of candidate words for replacing the mistranscription. The selecting is based on similarity values determined for each vocabulary word, each similarity value indicating a closeness of a corresponding vocabulary word to the mistranscription. The operations include modifying the textual rendering by replacing the mistranscription with a candidate word that, based on a comparison of average semantic similarity values of each candidate word in relation to each word contained in the augmented rendering, is more similar to the mistranscription than is each of the other candidate words.

In one or more embodiments, a computer program product includes one or more computer readable storage media having instructions stored thereon. The instructions are executable by a processor to initiate operations. The operations include obtaining a textual rendering of an audio portion of a video, the textual rendering generated by a natural language speech-to-text processor. The operations include generating an augmented rendering by combining the textual rendering with contextualizing data that is electronically garnered from one or more sources other than the audio portion of the video. The operations include identifying a mistranscription within the textual rendering using a pretrained word embedding model that creates machine-encoded data structures based on mapping words to an embedding space derived from the contextualizing data. The operations include selecting from among a multi-word vocabulary of the pretrained word embedding model a plurality of candidate words for replacing the mistranscription. The selecting is based on similarity values determined for each vocabulary word, each similarity value indicating a closeness of a corresponding vocabulary word to the mistranscription. The operations include modifying the textual rendering by replacing the mistranscription with a candidate word that, based on a comparison of average semantic similarity values of each candidate word in relation to each word contained in the augmented rendering, is more similar to the mistranscription than is each of the other candidate words.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to natural language processing, and more particularly, to automated transcribing of audio portions of video content. Video content presented over a channel often includes a textual rendering of the audio portion on the video, typically superimposed along the border so as not to obscure or interfere with the visual images presented. A feature of certain channels, for example, is the automatic generation of a transcript of the audio content of a video file, wherein once the video file is uploaded, dialogue is automatically converted to text and then synchronized for delivery with video images of individuals speaking.

A verbatim transcript or other textual rendering can be used, for example, if the video's sound is unavailable or not clearly audible. For example, as when the video's audio is muted, distorted, or obscured by other noises, or when the viewer's hearing is impaired. A verbatim transcript or other textual rendering also can serve as a translation of audible dialogue that though heard is not in a language understood by a viewer.

Verbatim transcripts and other textual renderings of the audio portion of a video can, and not infrequently do, contain one or more mistranscriptions. A "mistranscription," as defined herein, is a misspelled word or a word that, though correctly spelled, is misused given the particular context in which the word is used. A phonetic spelling of a word can be a mistranscription. For example, the word "Keras" is a proper noun that refers to an open-source library that provides an interface for artificial neural networks, but whose pronunciation is identical to other words such as "Kerris." Homonyms often give rise to mistranscriptions. One type of homonym is the homophone, a word pronounced the same as another but having a different spelling and meaning (e.g., "pair" and "pear"). The distinction can only be understood within the context that the word is used. Another type of homonym is the homograph, a word that though spelled the same as another word has an entirely different meaning (e g., "bank," as in "Federal Reserve Bank" and "the Nile river bank"), the meaning varying depending on the specific context in which the word is used. Thus, again, the distinction can only be understood within the context that the word is used. The English language is notable for its numerous homonyms.

The systems, methods, and computer program products disclosed herein provide mechanisms with enhanced capabilities and precision for automatically identifying and correcting mistranscriptions that occur in textual renderings of the audio portions of videos. The textual renderings comprise words predicted by natural language speech-to-text processing of the audio signals of a channel-hosted video.

An aspect of the systems, methods, and computer program products is the electronic garnering of contextualizing data from one or more sources other than the audio portion of a video. The contextualizing data expands the embedding space to which words and/or phrases converted into vectors are mapped. As defined herein, "embedding space" is a vector space, $V \subset \mathbb{R}^n$, in which phrases and/or words drawn from a predefined vocabulary are represented numerically by n-element feature vectors, wherein the n-th element of each vector is a word feature represented by a real number. By expanding the embedding space created by a word embedding model, the systems, methods, and computer program products readily recognize mistranscriptions, both misspelled words, as well as words used out of context. The word embedding model is either newly created or is created by fine tuning a pre-trained model based on the contextualizing data. As described herein, the word embedding model derived from contextualized data is used to identify errors in text embedded in electronic documents or audio converted to text by a speech-to-text processor.

Determining which word of a predetermined vocabulary is most likely to occur within an identified context is another aspect of the systems, methods, and computer program products described herein, the determining facilitated by expanding the embedding space with contextualizing data. A misspelling or out-of-context mistranscription is corrected by substituting the word determined to be most likely to occur for the mistranscription. Proper nouns and other lexical entities related to a specific contextual domain are readily identified and, given the specific context within the audio portion of a video, used to automatically correct any mistranscription by appropriate substitution.

Further aspects of the embodiments described within this disclosure are described in greater detail with reference to the figures below. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Figure 1:
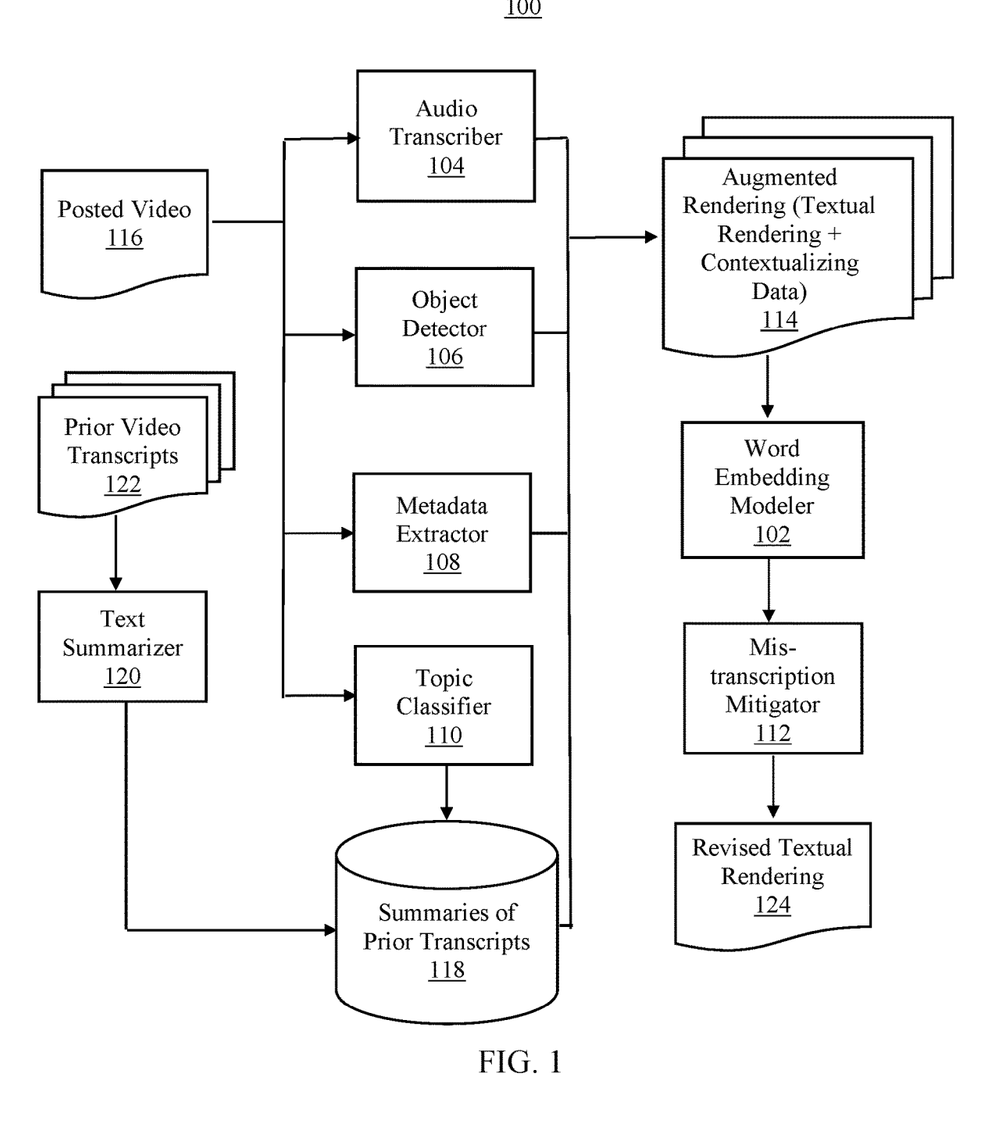
FIG. 1 depicts an example audio mistranscription mitigation system according to an embodiment.
Figure 5:
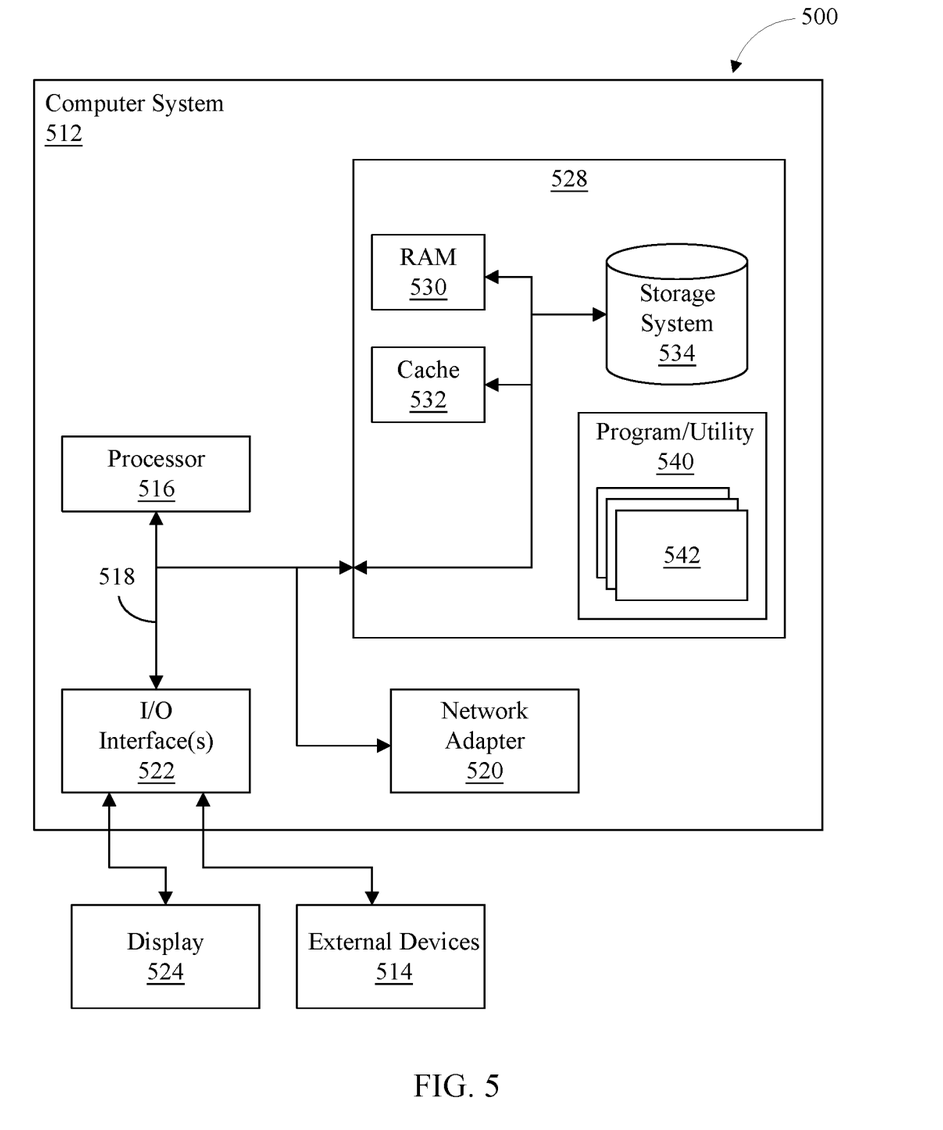
FIG. 5 depicts a cloud computing node according to an embodiment.

FIG. 1 depicts example audio mistranscription mitigation (AMM) system 100, according to one embodiment. AMM system 100 illustratively includes word embedding modeler 102, audio transcriber 104, object detector 106, metadata extractor 108, topic classifier 110, and mistranscription mitigator 112. Word embedding modeler 102, audio transcriber 104, object detector 106, metadata extractor 108, topic classifier 110, and mistranscription mitigator 112 of AMM system 100 can be implemented in hardware. The hardware can comprise dedicated circuitry, program code executable on one or more processors, or a combination thereof. In some embodiments, AMM system 100 is implemented in a computing node (e.g., cloud-based server), such as computing node 500 (FIG. 5). Accordingly, implemented in a computing node, AMM system 100 comprises program code in which word embedding modeler 102, audio transcriber/vectorizer 104, object detector 106, metadata extractor 108, topic classifier 110, and mistranscription mitigator 112 each comprise distinct software modules that perform the functions described herein. The software modules can be stored in a memory such as memory 528 and can execute on one or more processors such as processor(s) 516 of computer system 512 (FIG. 5).

AMM system 100 can operatively couple via a data communications network, typically the Internet, to one or more video platforms and/or video program broadcasters. AMM system 100 can also connect to video content providers via a wide area network (WAN), a local area network (LAN), and/or other type of communications network.

AMM system 100 can operatively couple to multiple channels created on one or more video platforms.

Word embedding modeler 102 is a machine learning model that is trained to perform natural language processing tasks. A text corpus input to word embedding modeler 102 is converted to vectors corresponding to the words of the text corpus. Through mathematical embedding from a high-dimensional space per word to a lower dimension embedding space, word embedding modeler 102 maps words and/or phrases to real-valued vectors. Word embedding modeler 102, in some embodiments, is pre-trained by performing the specific machine learning task of predicting a random selection of missing words from sentences drawn from a large text corpus. By performing the task repeatedly, word embedding model "learns" how sentences fit together grammatically and how to predict words and identify words such as homonyms whose meaning depends of the context in which the words are used. In some embodiments, word embedding modeler 102 can be implemented in a two-layer neural network. In other embodiments, word embedding modeler 102 can be implemented in a deep learning neural network. In still other embodiments, word embedding modeler 102 can be implemented in still other machine learning models, including transformer-based ones such as the Bidirectional Encoder Representations from Transformers (BERT) and ones based on deep contextualized word representation models such as ELMo.

Word embedding modeler 102 performs natural language processing functions on augmented rendering 114. Augmented rendering 114 comprises a combination of the textual rendering of audio portions of posted video 116, posted to a video channel, and contextualizing data electronically garnered from one or more sources other than the audio portion of posted video 116. In some embodiments, the textual rendering is obtained from an online video platform or video broadcaster via a wired or wireless connection to the Internet, a WAN, a LAN, or other type of communications network. Optionally, in certain embodiments, AMM system 100 includes audio transcriber 104, which generates a textual rendering by performing natural language text-to-speech processing of the audio portion of posted video 116.

Contextualizing data can be electronically garnered from one or more sources such as metadata (e.g., title, description) extracted from posted video 116, optical character recognition (OCR) data derived from video frames of posted video 116, object tags assigned to objects detected in the video frames of posted video 116, and/or other sources of contextualizing data from sources separate from the audio portion of posted video 116. As defined herein, with respect to a specific word, "contextualizing data" is any other word, phrase, image, or metadata that makes one or more meanings of the word more likely than other meanings.

AMM system 100, in certain embodiments, includes object detector 106. Object detector 106 comprises a machine learning model that is trained to identify and tag objects that appear in one or more video frames of posted video 116. In some embodiments, object detector 106 comprises a convolutional neural network, a feed-forward deep learning neural network especially well-suited for image processing. The object detector 106 CNN can be trained to identify an object in one or more images of posted video 116 and tag the images with a descriptive word or phrase that describes each object detected and identified. The tags are combined with the textual rendering as part of augmented rendering 114, thereby expanding the embedding space for identifying and correcting mistranscriptions that may occur in the textual rendering.

Once the contextual text data from the video is extracted, a contextual vocabulary can by expanded by discovery of other related words in the given context. This is achieved using various knowledge graphs or ontologies with relationships across words. For example, with respect to contextual texts related to computers, AMM system 100 can expand the contextual vocabulary by adding all related computer words to computers.

In other embodiments, AMM system 100 includes an optical character reader or similar such device (not explicitly shown) for performing OCR. OCR converts images of typed, handwritten, and/or printed text appearing in posted video 116, converting the images into machine-encoded data. If available from images of posted video 116, OCR data derived from one or more video frames of posted video 116 can further augment augmented rendering 114 for identifying and correcting mistranscriptions that may occur in the textual rendering.

Posted video 116 can contain metadata. Metadata can include, for example, a title of posted video 116. Other metadata can include a synopsis or description of posted video 116. Accordingly, in certain embodiments, AMM system 100 includes metadata extractor 108, which extracts metadata from posted video 116 and augments augmenting rendering 114 with the metadata, thereby further expanding the embedding space for identifying and correcting mistranscriptions that may occur in the textual rendering.

In some embodiments, AMM system 100 includes topic classifier 110. Topic classifier 110 comprises a machine learning classification model that is trained to classify textual renderings according to the topic or subject matter of each specific textual rendering. Topic classifier 110 can implement a deep learning neural network that is trained through supervised learning using a large corpus of labeled texts to classify textual renderings. Topic classifier 110 can be used to select one or more electronically stored summaries of prior transcripts 118, the selection(s) based on the topic(s) of the textual renderings as determined by topic classifier 110. Accordingly, topic classifier 110 can identify one or more topics of posted video 116 and, based on the identified topic(s), one or more summaries of prior transcripts can be combined with textual rendering and other contextualizing data of augmented rendering 114 for identifying and correcting mistranscriptions that may occur in the textual rendering.

In certain embodiments, AMM system 100 includes text summarizer 120. Text summarizer (implemented, for example, as an additional software module) summarizes prior video transcripts 122 of previously uploaded videos and electronically stores the summaries in a database along with other summaries of prior transcripts 118.

Word embedding modeler 102 converts the words of the textual rendering into vectors in the embedding space. Word embedding modeler 102 likewise converts words of the contextualized data (e.g., video title, video description, object tags, OCR text, summaries of prior transcriptions) into vectors in the embedding space. Word embedding modeler 102 thus maps the words of augmented rendering 114 to real-valued vectors, which can be encoded in a machine-readable data structure. Operatively, word embedding modeler 102 identifies a mistranscription within the textual rendering. A mistranscription comprising a misspelled word is identified by word embedding modeler 102 comparing each word contained in the textual rendering with the words of a predetermined, multi-word vocabulary corresponding to the pretrained word embedding model generated by word embedding modeler 102. A word contained in the textual rendering that is not included in the vocabulary is likely a misspelled word, one type of mistranscription identifiable by embedding word modeler 102.

A mistranscription comprising an out-of-context word (e.g., misused homonym) is identified by determining the semantic similarity of each vocabulary word in relation to the mistranscription. A word contained in the textual rendering that is included in the vocabulary but only weakly similar semantically to each vocabulary word is likely used out of context, another type of mistranscription identifiable by embedding word modeler 102.

In various embodiments, AMM system 100 can use different similarity metrics to measure the degree to which one word is semantically or textually similar to other words. As defined herein, "similarity metric" is a measure of the similarity in spelling (textual similarity) or meaning (semantic similarity). The respective similarity measures of two words with respect to a third can indicate which of the two words is more similar than the other to the third word in terms of the word' meanings or spellings.

"Semantic similarity," as defined herein, is any ordinal or interval variable whose values provide a measure of how similar the meaning of one word is to another within a given context. Semantic similarity can be measured by a similarity value that is a numerical distance between numerical representations (e.g., vectors) of words, the distances corresponding to the closeness of one word to another in terms of meaning or semantic content. One measure of semantic similarity is cosine similarity. The cosine similarity is:

$$\cos(\theta) = \frac{A \cdot B}{\|A\|\|B\|} = \frac{\sum_{i=1}^{n} A_i B_i}{\sqrt{\sum_{i=1}^{n} A_i^2} \sqrt{\sum_{i=1}^{n} B_i^2}}$$

where A and B are vector representations of two distinct words. Accordingly, cosine similarity provides a quantitative measure of semantic closeness between the words based on the cosine of the angle between the vector representations of the words.

As defined herein, "textual similarity" is a numerical measure of similarity in spelling of words. A similarity value of a textual similarity metric, for example, is a Levenshtein distance. The Levenshtein distance, $Lev_{a,b}(|a|, |b|)$, between two character strings (words) a and b whose lengths are $|a|$ and $|b|$, respectively, is:

$$Lev_{a,b}(i, j) = \begin{cases} \max(i, j) & \text{if } \min(i, u) = 0 \\ \min \begin{cases} Lev_{a,b}(i-1, j) + 1 \\ Lev_{a,b}(i, j-1) + 1 \\ Lev_{a,b}(i-1, j-1) + 1_{(a_i \neq b_j)} \end{cases} & \text{Otherwise} \end{cases}$$

where $1_{(a_i \neq b_j)}$, an indicator function, is zero if $a_i = b_i$ and is one otherwise, and where $Lev_{a,b}(i,j)$ is the distance between the first i characters of a and the first j characters of b.

Word embedding modeler 102 in certain embodiments identifies mistranscriptions resulting from out-of-context uses of a word contained in a textual rendering based on Levenshtein distances of the word relative to other words. With respect to words contained in the textual rendering of the audio portion of posted video 116, word embedding modeler 102 determines Levenshtein distances between each word contained in the textual rendering with respect to the words contained in augmented rendering 114. Thus, for each word in the textual rendering, word embedding modeler 102 determines the Levenshtein distances between the specific word and other words contained in the textual rendering as well as words from the contextualized data. A word having an average Levenshtein distance greater than a predetermined norm is identified as a mistranscription that results from an out-of-context use of the word.

With respect to both types of mistranscription—misspelled words and out-of-context words—mistranscription mitigator 112 utilizes a predetermined vocabulary and a predefined similarity metric to determine a word substitution that is most likely correct given the specific context in which the word is used in the textual rendering. The vocabulary can be the multi-word vocabulary of the pretrained word embedding model. Mistranscription mitigator 112 determines K words from the predetermined vocabulary, the K words are those having the closest semantic distance to the mistranscription identified by word embedding modeler 102. In certain embodiments, mistranscription mitigator 112 determines the K words semantically closest to the mistranscription based on Levenshtein distances between each of the K words and the mistranscription.

For each of the K words, mistranscription mitigator 112 determines an average semantic similarity between each word and all of the words contained in augmented rendering 114, that is, the words contained in the textual rendering as well as words derived from the contextualizing data. Mistranscription mitigator 112, in certain embodiments, determines the semantic similarities based on the cosine similarity between the vector representations of each of the K words and of all the words of augmented rendering 114. Of the K words selected, the word having the smallest cosine relative to all the words of augmented rendering 114 is identified as being semantically closest to the mistranscription given the context in which the mistranscription occurs. Note that a zero cosine, indicating orthogonality, would have no relation, while a cosine of one would indicate an identical match. The semantically closest word is most likely the correct word given the context. Therefore, having identified the word that is most likely the correct word given the specific context, mistranscription mitigator 112 replaces the identified mistranscription with the word having the closest semantic similarity to all the words of augmented rendering 114. With replacement of the mistranscription, AMM system 100 generates revised textual rendering 124. A revised textual rendering includes multiple replacements whenever AMM system 100 identifies and corrects multiple mistranscriptions in a textual rendering.

The identification and correction of one or more mistranscriptions in the textual rendering of the audio portion of posted video 116 can be performed in real time during a real-time rendering of posted video 116 over a channel hosted by an online video platform communicatively coupled with AMM system 100.

Figure 2:
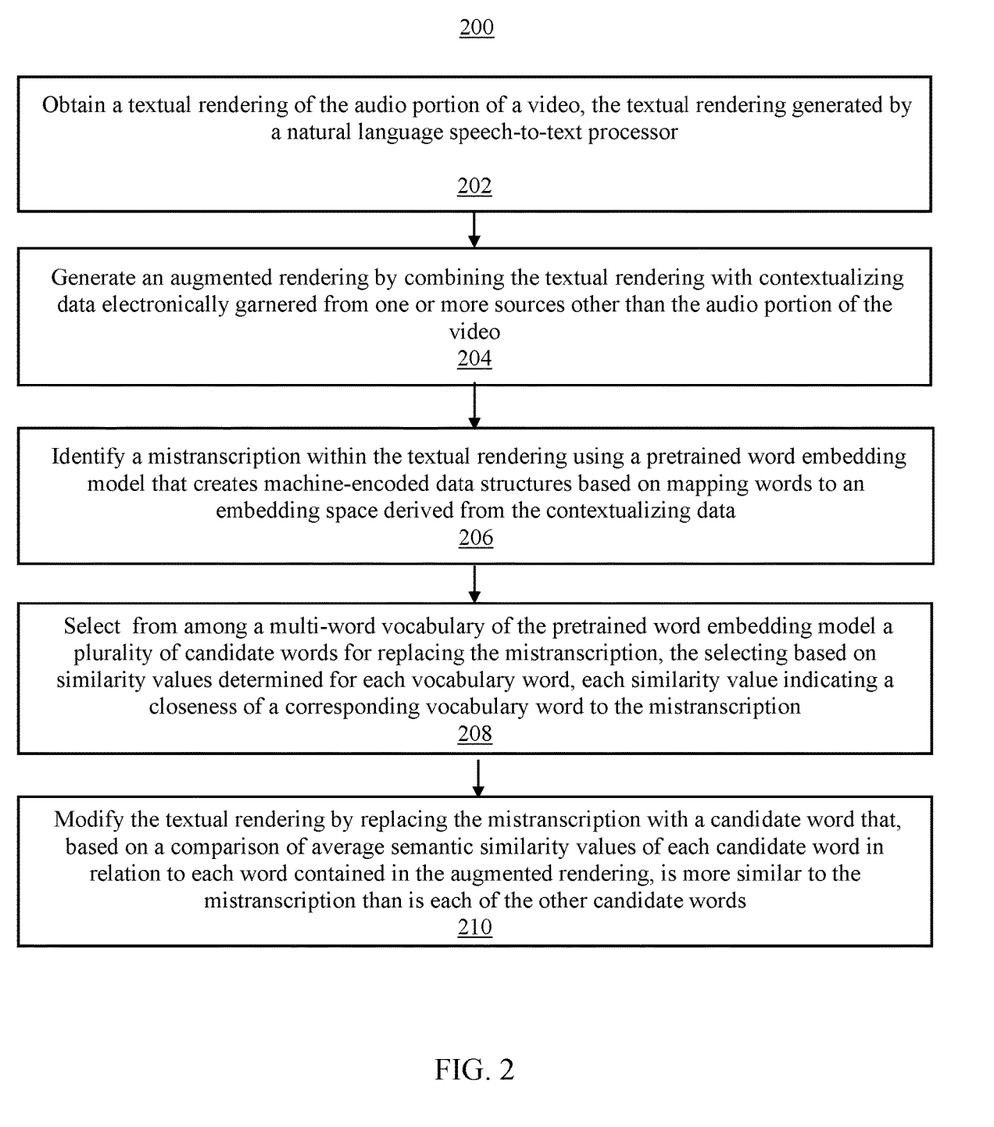
FIG. 2 is a flowchart of an example method of mitigating audio mistranscriptions according to an embodiment.

FIG. 2 is a flowchart of example method 200 of mitigating mistranscriptions in a textual rendering of the audio portion of a video according to one embodiment. Method 200 can be performed by the same or similar systems as described with reference to FIG. 1. The system at block 202 obtains a textual rendering of the audio portion of a video. The textual rendering can be generated by a natural language speech-to-text processor.

At block 204, the system generates an augmented rendering. The augmented rendering is generated as a machine-encoded data structure that combines the textual rendering with contextualizing data. The contextualizing data is electronically garnered by the system from one or more sources other than the audio portion of the video. The system, in some embodiments, electronically garners contextualizing data by extracting metadata from the video. In other embodiments the system garners contextualizing data by generating machine-encoded text based on optical character recognition performed on one or more frames of the video by an optical character reader. The system, in yet other embodiments, garners contextualizing data by tagging one or more objects recognized in one or more frames of the video based on classifying the objects using a machine learning classification model such as a convolutional neural network. In still other embodiments, the system retrieves electronically stored summaries of textual renderings of audio portions of other videos previously captured from one or more channels.

At block 206, the system identifies a mistranscription within the textual rendering using a pretrained word embedding model that creates machine-encoded data structures based on a mapping of the words to an embedding space. The embedding can be a vector space, $V \subset \mathbb{R}^n$, in which phrases and/or words drawn from a predefined vocabulary are represented numerically by n-element real-valued vectors. The embedding space can be derived from the contextualizing data. The mistranscription can be a misspelled word. The system identifies a mistranscription due to misspelling by identifying a word in the textual rendering that is not contained in the multi-word vocabulary of the pretrained word embedding model.

The mistranscription can result from using a word that, though correctly spelled, is used out of context within the textual rendering. The system identifies a word used out of context by identifying a word in the textual rendering having an average similarity distance from each word in the multi-word vocabulary of the pretrained word embedding model greater than a predetermined level. In some embodiments, the average similarity distance is an average of the cosine similarity of the word with respect to each other word contained in the textual rendering.

At block 208, upon identifying a mistranscription, the system selects from among a multi-word vocabulary of the pretrained word embedding model a plurality of candidate words for replacing the mistranscription. The candidate words for replacing the mistranscription with are selected based on similarity values determined for each vocabulary word, each similarity value indicating a closeness of a corresponding vocabulary word to the mistranscription. The closeness can be in terms of textual similarity, measured for example by a Levenshtein distance. The closeness alternatively can be in terms of similarity of meaning, measured for example by a cosine similarity. In other embodiments, other semantic and/or textual similarity metrics can be used to select a plurality of candidate words.

At block 210, the system modifies the textual rendering by replacing the mistranscription with a candidate word that, based on a comparison of average semantic similarity values for each candidate word in relation to each word contained in the augmented rendering, is more similar to the mistranscription than is each of the other candidate words.

The plurality of candidate words are selected from among the vocabulary words based on a semantic similarity value of each vocabulary word. The similarity value indicates a closeness in meaning of the vocabulary word to the mistranscription. For example, based on the Levenshtein distance of each vocabulary word in relation to the mistranscription, the K words determined to be closest to the identified mistranscription can be the ones selected as candidate words.

At block 212, the system determines an average semantic similarity value of each candidate word in relation to each word contained in the augmented rendering. The system at block 214 modifies the textual rendering by replacing the mistranscription with the candidate word that, based on a comparison of the average semantic similarity values, is more similar to the mistranscription than is each of the other candidate words. The average semantic similarity values, in certain embodiments, is an average of each candidate word's cosine similarities to each word in the augmented rendering.

The procedures can be repeated for each mistranscription identified within the textual rendering. In some embodiments, the system identifies mistranscriptions and modifies the textual rendering accordingly in real time during a real-time rendering of the video over a channel hosted by an online video platform.

In certain embodiments, the system is implemented in a cloud-based or other type of server. Thus, in some embodiments, the procedures described are performed in a cloud computing environment.

It is expressly noted that although this disclosure includes a detailed description on cloud computing, implementations of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 3:
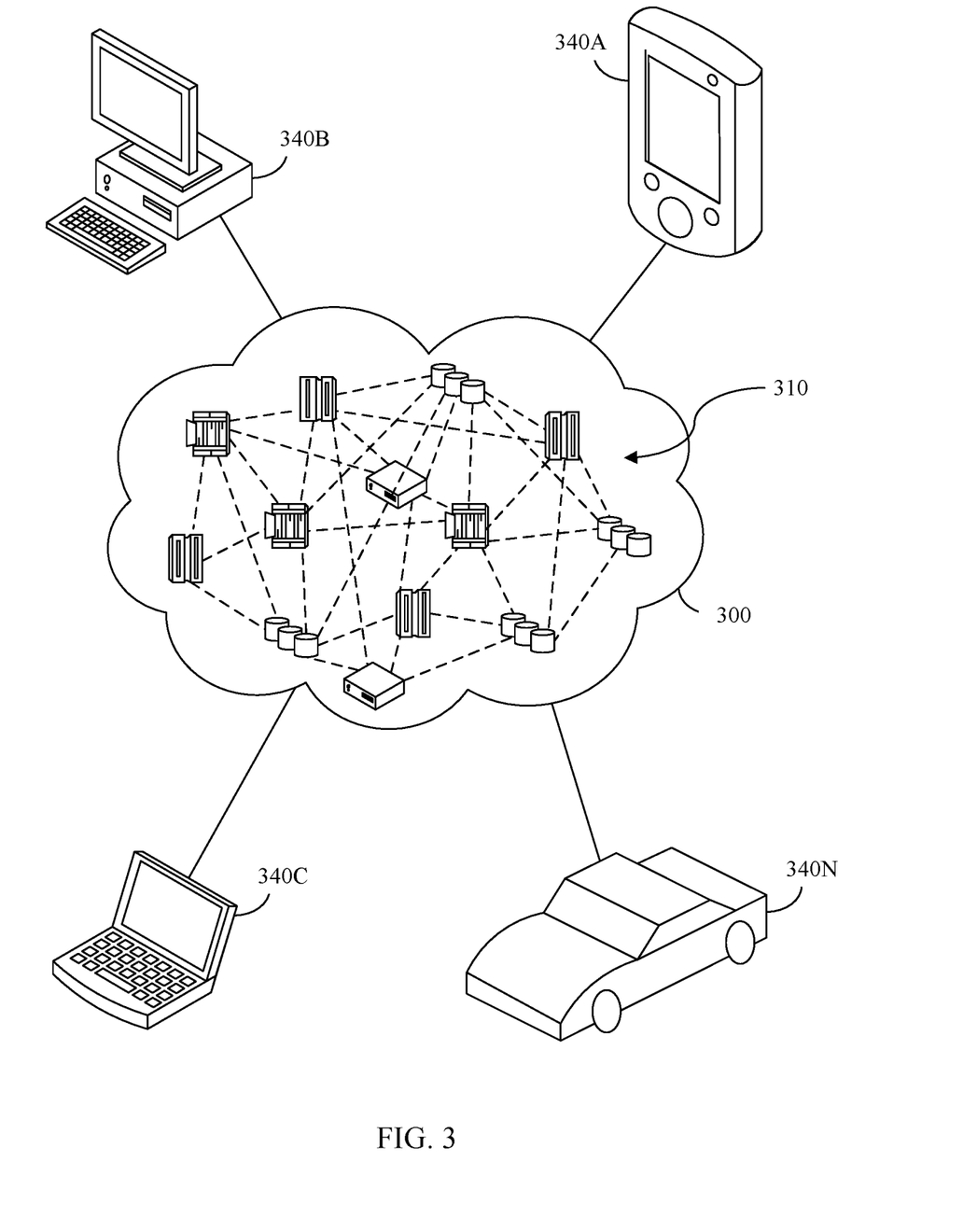
FIG. 3 depicts a cloud computing environment according to an embodiment.

Referring now to FIG. 3, illustrative cloud computing environment 300 is depicted. As shown, cloud computing environment 300 includes one or more cloud computing nodes 310 with which local computing devices used by cloud consumers, such as, for example, personal digital assistant (PDA) or cellular telephone 340a, desktop computer 340b, laptop computer 340c, and/or automobile computer system 340n may communicate. Computing nodes 310 may communicate with one another. They may be grouped (not shown) physically or virtually, in one or more networks, such as Private, Community, Public, or Hybrid clouds as described hereinabove, or a combination thereof. This allows cloud computing environment 300 to offer infrastructure, platforms and/or software as services for which a cloud consumer does not need to maintain resources on a local computing device. It is understood that the types of computing devices 340a-n shown in FIG. 3 are intended to be illustrative only and that computing nodes 310 and cloud computing environment 300 can communicate with any type of computerized device over any type of network and/or network addressable connection (e.g., using a web browser).

Figure 4:
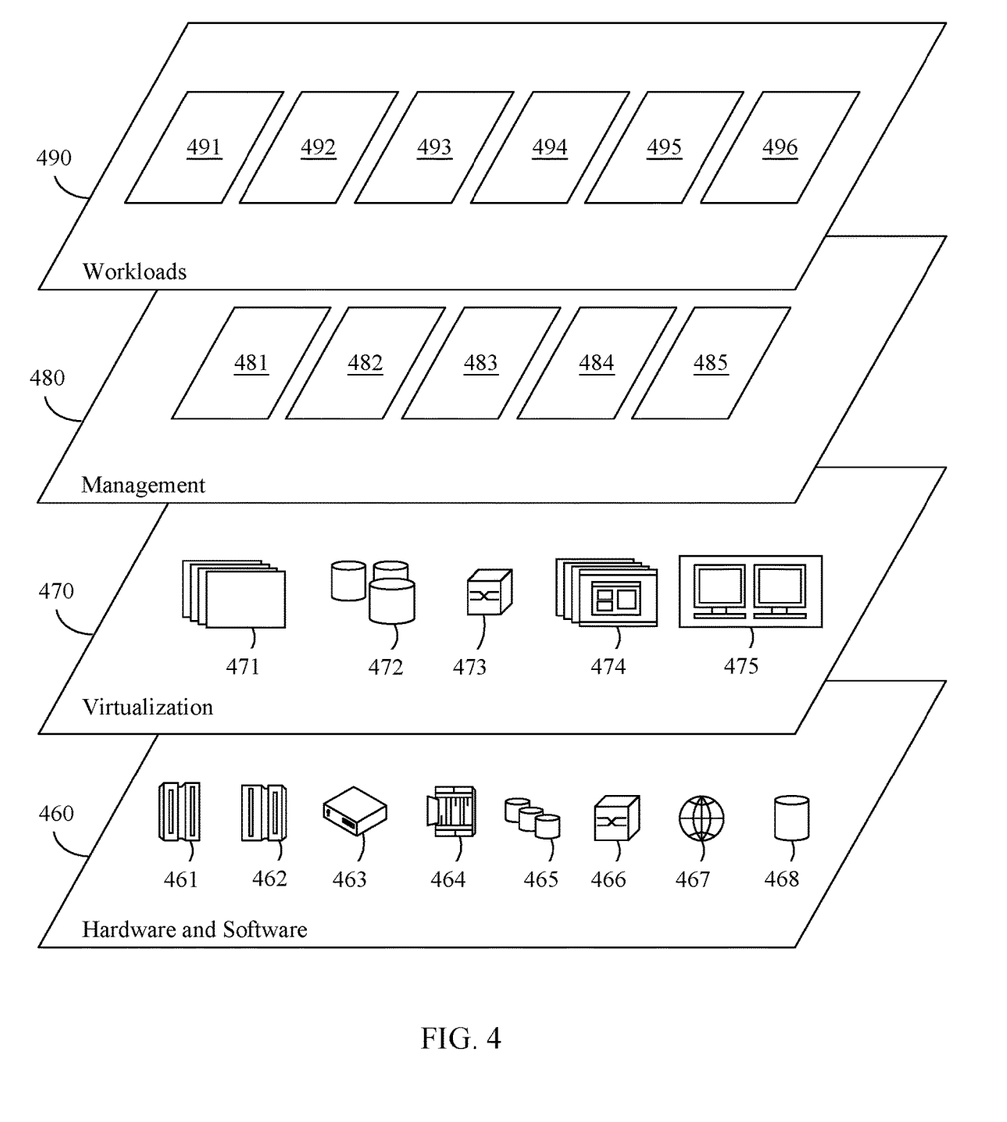
FIG. 4 depicts abstraction model layers according to an embodiment.

Referring now to FIG. 4, a set of functional abstraction layers provided by cloud computing environment 300 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 460 includes hardware and software components. Examples of hardware components include mainframes 461; RISC (Reduced Instruction Set Computer) architecture-based servers 462; servers 463; blade servers 464; storage devices 465; and networks and networking components 466. In some embodiments, software components include network application server software 467 and database software 468.

Virtualization layer 470 provides an abstraction layer from which the following examples of virtual entities may be provided: virtual servers 471; virtual storage 472; virtual networks 473, including virtual private networks; virtual applications and operating systems 474; and virtual clients 475.

In one example, management layer 480 may provide the functions described below. Resource provisioning 481 provides dynamic procurement of computing resources and other resources that are utilized to perform tasks within the cloud computing environment. Metering and Pricing 482 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 483 provides access to the cloud computing environment for consumers and system administrators. Service level management 484 provides cloud computing resource allocation and management such that required service levels are met. Service Level Agreement (SLA) planning and fulfillment 485 provide pre-arrangement for, and procurement of, cloud computing resources for which a future requirement is anticipated in accordance with an SLA.

Workloads layer 490 provides examples of functionality for which the cloud computing environment may be utilized. Examples of workloads and functions which may be provided from this layer include: mapping and navigation 491; software development and lifecycle management 492; virtual classroom education delivery 493; data analytics processing 494; transaction processing 495; and AMM system 496.

FIG. 5 illustrates a schematic of an example of a computing node 500. In one or more embodiments, computing node 500 is an example of a suitable cloud computing node. Computing node 500 is not intended to suggest any limitation as to the scope of use or functionality of embodiments of the invention described herein. Computing node 500 is capable of performing any of the functionality described within this disclosure.

Computing node 500 includes a computer system 512, which is operational with numerous other general-purpose or special-purpose computing system environments or configurations. Examples of well-known computing systems, environments, and/or configurations that may be suitable for use with computer system 512 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 512 may be described in the general context of computer system-executable instructions, such as program modules, being executed by a computer system. Generally, program modules may include routines, programs, objects, components, logic, data structures, and so on that perform particular tasks or implement particular abstract data types. Computer system 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system 512 is shown in the form of a general-purpose computing device. The components of computer system 512 may include, but are not limited to, one or more processors 516, a memory 528, and a bus 518 that couples various system components including memory 528 to processor 516. As defined herein, "processor" means at least one hardware circuit configured to carry out instructions. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

The carrying out of instructions of a computer program by a processor comprises executing or running the program. As defined herein, "run" and "execute" comprise a series of actions or events performed by the processor in accordance with one or more machine-readable instructions. "Running" and "executing," as defined herein refer to the active performing of actions or events by the processor. The terms run, running, execute, and executing are used synonymously herein.

Bus 518 represents one or more of any of several types of bus structures, including a memory bus or memory controller, a peripheral bus, an accelerated graphics port, and a processor or local bus using any of a variety of bus architectures. By way of example only, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Computer system 512 typically includes a variety of computer system-readable media. Such media may be any available media that is accessible by computer system 512, and may include both volatile and non-volatile media, removable and non-removable media.

Memory 528 may include computer system readable media in the form of volatile memory, such as random-access memory (RAM) 530 and/or cache memory 532. Computer system 512 may further include other removable/non-removable, volatile/non-volatile computer system storage media. By way of example, storage system 534 can be provided for reading from and writing to a non-removable, non-volatile magnetic media and/or solid-state drive(s) (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein. For example, one or more of the program modules may include AMM system 496 or portions thereof.

Program/utility 540 is executable by processor 516. Program/utility 540 and any data items used, generated, and/or operated upon by computer system 512 are functional data structures that impart functionality when employed by computer system 512. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer system 512 may also communicate with one or more external devices 514 such as a keyboard, a pointing device, a display 524, etc.; one or more devices that enable a user to interact with computer system 512; and/or any devices (e.g., network card, modem, etc.) that enable computer system 512 to communicate with one or more other computing devices. Such communication can occur via input/output (I/O) interfaces 522. Still, computer system 512 can communicate with one or more networks such as a local area network (LAN), a general wide area network (WAN), and/or a public network (e.g., the Internet) via network adapter 520. As depicted, network adapter 520 communicates with the other components of computer system 512 via bus 518. It should be understood that although not shown, other hardware and/or software components could be used in conjunction with computer system 512. Examples, include, but are not limited to: microcode, device drivers, redundant processing units, external disk drive arrays, RAID systems, tape drives, and data archival storage systems, etc.

While computing node 500 is used to illustrate an example of a cloud computing node, it should be appreciated that a computer system using an architecture the same as or similar to that described in connection with FIG. 5 may be used in a non-cloud computing implementation to perform the various operations described herein. In this regard, the example embodiments described herein are not intended to be limited to a cloud computing environment. Computing node 500 is an example of a data processing system. As defined herein, "data processing system" means one or more hardware systems configured to process data, each hardware system including at least one processor programmed to initiate operations and memory.

Computing node 500 is an example of computer hardware. Computing node 500 may include fewer components than shown or additional components not illustrated in FIG. 5 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

Computing node 500 is also an example of a server. As defined herein, "server" means a data processing system configured to share services with one or more other data processing systems. As defined herein, "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. In one or more embodiments, the various user devices described herein may be client devices. Network infrastructure, such as routers, firewalls, switches, access points and the like, are not client devices as the term "client device" is defined herein.

The terminology used herein is for the purpose of describing particular embodiments only and is not intended to be limiting. Notwithstanding, several definitions that apply throughout this document now will be presented.

As defined herein, the singular forms "a," "an," and "the" include the plural forms as well, unless the context clearly indicates otherwise.

As defined herein, "another" means at least a second or more.

As defined herein, "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, "automatically" means without user intervention.

As defined herein, "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, "if" means "in response to" or "responsive to," depending upon the context. Thus, the phrase "if it is determined" may be construed to mean "in response to determining" or "responsive to determining" depending on the context. Likewise the phrase "if [a stated condition or event] is detected" may be construed to mean "upon detecting [the stated condition or event]" or "in response to detecting [the stated condition or event]" or "responsive to detecting [the stated condition or event]" depending on the context.

As defined herein, "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the phrases "in response to" and "responsive to" mean responding or reacting readily to an action or event. Thus, if a second action is performed "in response to" or "responsive to" a first action, there is a causal relationship between an occurrence of the first action and an occurrence of the second action. The phrases "in response to" and "responsive to" indicate the causal relationship.

As defined herein, "real time" means a level of processing responsiveness that a user or system senses as sufficiently immediate for a particular process or determination to be made, or that enables the processor to keep up with some external process.

As defined herein, "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

As defined herein, "user," "individual," and "viewer" each refer to a human being.

The terms first, second, etc. may be used herein to describe various elements. These elements should not be limited by these terms, as these terms are only used to distinguish one element from another unless stated otherwise or the context clearly indicates otherwise.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:

obtaining a textual rendering of an audio portion of a video, wherein the textual rendering is generated by a natural language speech-to-text processor;

classifying textual renderings of transcripts of other videos, previously captured from one or more channels, according to topics of the textual renderings;

selecting one or more electronically stored summaries of the transcripts of the other videos based on the classifying the textual renderings of the transcripts of other the videos, previously captured from the one or more channels, according to the topics of the textual renderings;

generating an augmented rendering for the portion of the video, the augmented rendering comprising a combination of the textual rendering for the portion of the video and contextualizing data comprising the one or more electronically stored summaries of the transcripts of the other videos previously captured from the one or more channels;

identifying a mistranscription within the textual rendering using a pretrained word embedding model that creates machine-encoded data structures based on mapping words to an embedding space derived from the contextualizing data;

selecting from among a multi-word vocabulary of the pretrained word embedding model a plurality of candidate words for replacing the mistranscription, the selecting based on similarity values determined for each vocabulary word, each similarity value indicating a closeness of a corresponding vocabulary word to the mistranscription; and modifying the textual rendering by replacing the mistranscription with a candidate word that, based on a comparison of average semantic similarity values of each candidate word in relation to each word contained in the augmented rendering comprising at least one tag of at least one object identified in one or more frames of the video, is more similar to the mistranscription than is each of the other candidate words.

2. The method of claim 1, further comprising generating the contextualizing data by summarizing textual renderings of audio portions of other videos previously captured from one or more channels.

3. The method of claim 1, wherein the identifying a mistranscription comprises identifying a word in the textual rendering that is not contained in the multi-word vocabulary of the pretrained word embedding model.

4. The method of claim 1, wherein the identifying a mistranscription comprises identifying a word in the textual rendering having an average similarity distance from each word in the multi-word vocabulary of the pretrained word embedding model greater than a predetermined level.

5. The method of claim 1, wherein the selecting is based on a Levenshtein distance.

6. The method of claim 1, wherein each average semantic similarity value is an average cosine similarity between a candidate word and each word of the augmented rendering.

7. The method of claim 1, wherein the modifying is performed in real time during a real-time rendering of the video over a channel.

8. A system, comprising:
a processor configured to initiate operations including:
obtaining a textual rendering of an audio portion of a video, wherein the textual rendering is generated by a natural language speech-to-text processor;
classifying textual renderings of transcripts of other videos, previously captured from one or more channels, according to topics of the textual renderings;
selecting one or more electronically stored summaries of the transcripts of the other videos based on the classifying the textual renderings of the transcripts of other the videos, previously captured from the one or more channels, according to the topics of the textual renderings;
generating an augmented rendering for the portion of the video, the augmented rendering comprising a combination of the textual rendering for the portion of the video and contextualizing data comprising the one or more electronically stored summaries of the transcripts of the other videos previously captured from the one or more channels;
identifying a mistranscription within the textual rendering using a pretrained word embedding model that creates machine-encoded data structures based on mapping words to an embedding space derived from the contextualizing data;
selecting from among a multi-word vocabulary of the pretrained word embedding model a plurality of candidate words for replacing the mistranscription, the selecting based on similarity values determined for each vocabulary word, each similarity value indicating a closeness of a corresponding vocabulary word to the mistranscription; and
modifying the textual rendering by replacing the mistranscription with a candidate word that, based on a comparison of average semantic similarity values of each candidate word in relation to each word contained in the augmented rendering comprising at least one tag of at least one object identified in one or more frames of the video, is more similar to the mistranscription than is each of the other candidate words.

9. The system of claim 8, further comprising generating the contextualizing data by summarizing textual renderings of audio portions of other videos previously captured from one or more channels.

10. The system of claim 8, wherein the identifying a mistranscription comprises identifying a word in the textual rendering that is not contained in the multi-word vocabulary of the pretrained word embedding model.

11. The system of claim 8, wherein the identifying a mistranscription comprises identifying a word in the textual rendering having an average similarity distance from each word in the multi-word vocabulary of the pretrained word embedding model greater than a predetermined level.

12. The system of claim 8, wherein the selecting is based on a Levenshtein distance.

13. The system of claim 8, wherein each average semantic similarity value is an average cosine similarity between a candidate word and each word of the augmented rendering.

14. A computer program product, the computer program product comprising: one or more computer-readable storage media, wherein the computer-readable storage media is not a signal per se, and program instructions collectively stored on the one or more computer-readable storage media, the program instructions executable by a processor to cause the processor to initiate operations including:
obtaining a textual rendering of an audio portion of a video, wherein the textual rendering is generated by a natural language speech-to-text processor;
classifying textual renderings of transcripts of other videos, previously captured from one or more channels, according to topics of the textual renderings;
selecting one or more electronically stored summaries of the transcripts of the other videos based on the classifying the textual renderings of the transcripts of other the videos, previously captured from the one or more channels, according to the topics of the textual renderings;
generating an augmented rendering for the portion of the video, the augmented rendering comprising a combination of the textual rendering for the portion of the video and contextualizing data comprising the one or more electronically stored summaries of the transcripts of the other videos previously captured from the one or more channels;
identifying a mistranscription within the textual rendering using a pretrained word embedding model that creates machine-encoded data structures based on mapping words to an embedding space derived from the contextualizing data;
selecting from among a multi-word vocabulary of the pretrained word embedding model a plurality of candidate words for replacing the mistranscription, the selecting based on similarity values determined for each vocabulary word, each similarity value indicating a closeness of a corresponding vocabulary word to the mistranscription; and
modifying the textual rendering by replacing the mistranscription with a candidate word that, based on a comparison of average semantic similarity values of each candidate word in relation to each word contained in the augmented rendering comprising at least one tag of at least one object identified in one or more frames of the video, is more similar to the mistranscription than is each of the other candidate words.

15. The computer program product of claim 14, further comprising generating the contextualizing data by summarizing textual renderings of audio portions of other videos previously captured from one or more channels.

16. The computer program product of claim 14, wherein the identifying a mistranscription comprises identifying a word in the textual rendering that is not contained in the multi-word vocabulary of the pretrained word embedding model.

17. The computer program product of claim 14, wherein the identifying a mistranscription comprises identifying a word in the textual rendering having an average similarity distance from each word in the multi-word vocabulary of the pretrained word embedding model greater than a predetermined level.

18. The computer program product of claim 14, wherein the selecting is based on a Levenshtein distance.

19. The computer program product of claim 14, wherein each average semantic similarity value is an average cosine similarity between a candidate word and each word of the augmented rendering.

20. The computer program product of claim 14, wherein the modifying is performed in real time during a real-time rendering of the video over a channel.

\* \* \* \* \*